(12) United States Patent
Sundarrajan et al.

(10) Patent No.: US 8,671,403 B2
(45) Date of Patent: Mar. 11, 2014

(54) PRE-CREATING VIRTUAL MACHINES IN A GRID ENVIRONMENT

(75) Inventors: Srikanth Sundarrajan, Chennai (IN); Hariprasad Nellitheertha, Bangalore (IN)

(73) Assignee: Infosys Limited, Bangalore (IN)

( * ) Notice: Subject to any disclaimer, the term of this patent is extended or adjusted under 35 U.S.C. 154(b) by 1782 days.

(21) Appl. No.: 11/749,074

(22) Filed: May 15, 2007

(65) Prior Publication Data

US 2007/0288224 A1  Dec. 13, 2007

(30) Foreign Application Priority Data

May 22, 2006 (IN) .............................. 884/CHE/2006

(51) Int. Cl.
*G06F 9/46* (2006.01)
(52) U.S. Cl.
USPC .............................................. 718/1; 718/104
(58) Field of Classification Search
USPC ................................................................ 718/1
See application file for complete search history.

(56) References Cited

U.S. PATENT DOCUMENTS

| 7,577,722 B1* | 8/2009 | Khandekar et al. ........... 709/220 |
| 7,577,959 B2* | 8/2009 | Nguyen et al. ................ 718/105 |
| 7,870,153 B2* | 1/2011 | Croft et al. .................... 707/781 |
| 8,464,092 B1* | 6/2013 | Gentes et al. ................. 714/4.11 |
| 2002/0013802 A1* | 1/2002 | Mori et al. ........................ 709/1 |
| 2005/0060704 A1* | 3/2005 | Bulson et al. ..................... 718/1 |
| 2009/0282404 A1* | 11/2009 | Khandekar et al. ............... 718/1 |
| 2011/0173491 A1* | 7/2011 | Takamoto et al. ........... 714/4.11 |

OTHER PUBLICATIONS

Carl A. Waldspurger; Memory Resource Management in VMware ESX Server; ACM 2002; 16 pages.*
Constantine R Sapuntzakis; Optimizing the Migration of Virtual Computers; ACM 2002, 14 pages.*
Ya-Yunn Su and Jason Flinn; Slingshot: Deploying Stateful Services in Wireless Hotspots; ACM 2005; 14 pages.*
Abels et al., "An Overview of Xen Virtualization," reprinted from *Dell Power Solutions*, 3 pages, Aug. 2005.
Adabala et al., "From Virtualized Resources to Virtual Computing Grids: The In-VIGO System," *Future Generation Computer Systems*, 14 pages, 2004.
Bannon et al., "Experiences with a Grid Gateway Architecture Using Virtual Machines," *Conference Proceedings at SC06*, Tampa, USA, 8 pages, 2006.
Bradshaw et al., "A Scalable Approach To Deploying And Managing Appliances," *TeraGrid 2007*, 6 pages, Jun. 4-8, 2007.

(Continued)

*Primary Examiner* — Abdullah Al Kawsar
(74) *Attorney, Agent, or Firm* — Klarquist Sparkman, LLP

(57) ABSTRACT

Virtual machines can be pre-created in a grid environment. Pre-created machines can be of a tiny configuration to avoid consuming resources. A request for a virtual machine in the grid can be granted by ballooning a pre-created tiny virtual machine to a larger configuration. The tiny pre-created virtual machine can be advertised as being of a non-tiny configuration. Agents can work in concert to coordinate handing requests for a virtual machine in the grid. The virtual machine can be initialized before it is reduced to a tiny configuration. Ballooning the virtual machine can take considerably less time than creating it from scratch. Thus, high performance computing can be provided on virtual machines in a grid environment, enabling virtual machine technology to be applied in a wide variety of grid-based scenarios.

20 Claims, 10 Drawing Sheets

(56) References Cited

OTHER PUBLICATIONS

"COD: Cluster-On-Demand," *Computer Science Department*, Duke University, http://www.cs.duke.edu/nicl/cod/, 5 pages, visited May 3, 2007.
Dragovic et al, "Xen and the Art of Virtualization," *Proc. ACM Symposium on Operating Systems Principles*, 14 pages, Oct. 2003.
Figueiredo et al, "A Case for Grid Computing on Virtual Machines," *Proc. 23rd Int'l Conf. Distributed Computing Systems (ICDCS)*, IEEE CS Press, pp. 550-559, 2003.
Foster et al., "Virtual Clusters for Grid Communities," *CCGRID 2006*, Singapore, 8 pages, May 16-19, 2006.
Freeman et al., "Division of Labor: Tools for Growth and Scalability of Grids," *ICSOC 2006*, 13 pages, Dec. 4-7, 2006.
Freeman et al., "Virtual Workspace Appliances," *SC06 Booth Presentation*, 27 pages, Nov. 11-17, 2006.
Freeman, "Virtual Clusters for Grid Communities," *CCGrid 06*, 55 pages, May 16-19, 2006.
"Frequently asked questions," *IBM Grid Computing*, http://www-03.ibm.com/grid/about_grid/faq.shtml, 4 pages, visited May 2, 2007.
Galron et al., "Quality of Life in the Grids: VMs meet Bioinformatics Applications," *SC04 Poster*, 1 page, Nov. 6-12, 2004.
"Grid Computing," *Wikipedia*, http://en.wikipedia.org/wiki/Grid_computing, 10 pages, visited May 2, 2007.
Hardt et al., "Xen Grid Site—the Art of Consolidation," public.eu-egee.org/files/xen-grid-in-a-box-fzk.pdf, egee (Enabling Grids for E-SciencE), 6 pages visited May 3, 2007.
Jiang et al., "VIOLIN: Virtual Internetworking on OverLay Infrastructure," *CS Technical Report CSD TR 03-027*, Purdue University, 6 pages, Jul. 2003.
Keahey et al., "Dynamic Creation and Management of Runtime Environments in the Grid," *Workshop on Designing and Building Web Services (GGF 9)*, Chicago, IL, 7 pages, Oct. 2003.
Keahey et al., "From Sandbox to Playground: Dynamic Virtual Environments in the Grid," *Grid 2004*, 19 pages, Nov. 8, 2004.
Keahey et al., "Living on the Edge: OSG Edge Services Framework," *SCO5 Booth Presentation*, 20 pages, Nov. 12-18, 2005.
Keahey et al., "Virtual Workspaces in the Grid," *EuroPar 2005*, 16 pages, Sep. 1, 2005.
Keahey et al., "Virtual Workspaces in the Grid," *Galron. Europar 2005*, Lisbon, Portugal, 11 pages, Sep. 2005.
Keahey et al., "Virtual Workspaces: Achieving Quality of Service and Quality of Life in the Grid," *Scientific Programming Journal*, vol. 13, No. 4, 2005, *Special Issue: Dynamic Grids and Worldwide Computing*, pp. 265-276, 12 pages, published online Jan. 5, 2006.
Keahey et al., "Working Spaces: Virtual Machines in the Grid," *GlobusWorld 2005*, 23 pages, Feb. 10, 2005.
Keahey, "Division of Labor: Tools for Growing and Scaling Grids," *ICSOC 06*, 32 pages, Dec. 5, 2006.
Keahey, "From Sandbox to Playground: Virtual Environments and Quality of Service in the Grids," *IEEE Fox Valley Subsection*, 24 pages, Nov. 8, 2004.
Keahey, "On-Demand Virtual Workspaces: Quality of Life in the Grid," *5th Meeting of Spanish Initiative in Grid Middleware*, Granada, Spain, 29 pages, Nov. 13-24, 2006.
Keahey, "Virtual Playground: From Quality of Service to Quality of Life in the Grids," *PSNC Seminar*, 27 pages, Jun. 24, 2004.
Keahey, "Virtualization: Towards More Flexible and Efficient Grids," *PPAM 2005*, 27 pages, Sep. 13, 2005.
Keahey, "Workspaces for CE Management," *EGEE All Hands Meeting, Brno*, 16 pages, Jun. 22, 2005.
Krsul et al, "VMPlants: Providing and Managing Virtual Machine Execution Environments for Grid Computing," *Proc. IEEE/ACM Supercomputing*, 12 pages, 2004.
Lu et al., "Making your workspace secure: establishing trust with VMs in the Grid," *SC05 Poster*, 10 pages, Nov. 12-18, 2005.
Nellitheertha, "Nova: An Approach to On-Demand Virtual Execution Environments for Grids," PowerPoint presentation, *Sixth IEEE International Symposium on Cluster Computing and the Grid*, 17 pages, (CCGRID '06), May 16-19, 2006.
"Platform Symphony," The Globus Alliance, http://www2.platform.com/products/symphony/, 2 pages, visited May 2, 2007.
Pötzl—revised version of 2005 document. "Paper," from Linux-VServer, http://linux-vserver.org/Paper, 23 pages, Feb. 26, 2007.
Rana et al., "An Edge Services Framework (ESF) for EGEE, LCG, and OSG," *Computing in High Energy and Nuclear Physics 2006 (CHEP)*, T.I.F.R. Mumbai, India, 4 pages, Feb. 2006.
Rosenblum et al. "Virtual Machine Monitors: Current Technology and Future Trends" *Computer*, vol. 38, pp. 39-47, May 2005.
Silberschatz et al, *Operating Systems Concepts, Addison-Wesley, III Edition*, pp. 54-55, 1991.
Singh, "A Taste of Computer Security—Sandboxing," www.kernelthread.com/publications/security/sandboxing.html, 6 pages, 2005.
Sotomayor et al, "Overhead Matters: A Model for Virtual Resource Management," *VTDC 2006*, 8 pages, Nov. 17, 2006.
Sotomayor, "A Resource Management Model for VM-Based Virtual Workspaces," *Masters paper*, University of Chicago, 63 pages, Feb. 23, 2007.
Sotomayor, "Resource Management for Virtual Clusters," *DSL Workshop*, 34 pages, Jun. 2006.
Sotomayor, "Virtual Machines for Grid Computing," *Midwest Grid Workshop 2007*, Chicago, Illinois, 13 pages, Mar. 24-25, 2007.
Spector, "Energizing Grid Computing," O'Reilly LinuxDevCenter.com, http://www.linuxdevcenter.com/pub/a/linux/2002/04/25/enterprise.html, 6 pages, Apr. 25, 2002.
Sundararaj et al., "Towards Virtual Networks for Virtual Machine Grid Computing," in *3rd USENIX Conference on Virtual Machine Technology*, 14 pages, 2004.
Sundarrajan et al., "Nova: An Approach to On-Demand Virtual Execution Environments for Grids," *Sixth IEEE International Symposium on Cluster Computing and the Grid*, 4 pages, (CCGRID '06), May 16-19, 2006.
Tanenbaum et al, *Operating Systems, Design and Implementation, II Edition*, pp. 40-41, 1997.
The Globus Alliance, "Virtual Workspaces," http://workspace.globus.org/papers/index.html, 2 pages, visited May 2, 2007.
"Virtual Machine," *Wikipedia*, http://en.wikipedia.org/wiki/Virtual_machine, 6 pages, visited May 11, 2007.
"Virtualization for Grid Computing," The Globus Alliance, http://www2.platform.com/products/virtualization/, 2 pages, visited May 2, 2007.
"What is grid computing," *IBM Grid Computing*, http://www-03.ibm.com/grid/about_grid/what_is.shtml, 1 page, visited May 2, 2007.
Xen Team, *Xen 2.0, Users' manual, Xen 2.0 for x86*, University of Cambridge, 33 pages, 2004.
*Xen Users' Manual, Xen 3.0*, University of Cambridge et al., 96 pages, 2005.
Zhang et al., "Virtual Cluster Workspaces for Grid Applications," *TR-ANL/MCS-P1246-0405*, 12 pages, Apr. 2005.

* cited by examiner

PRE-CREATING VIRTUAL MACHINES IN A GRID ENVIRONMENT

BACKGROUND

Grid computing can provide a powerful paradigm for completing complex or numerous computing tasks. However, processing tasks on a native machine in the grid environment can present various problems relating to security and incompatibility.

Accordingly, it has been proposed that grid computing take advantage of the concept of a virtual machine. Virtual machines have numerous advantages, including addressing security issues and providing a compatible computing environment, regardless of the underlying hardware.

However, performance issues have plagued the application of virtual machines to grid computing.

SUMMARY

A variety of techniques can be used for pre-creating virtual machines in a grid computing environment. For example, a virtual machine can be pre-created in a grid. Subsequently, when a request for the virtual machine arrives, the request can be granted via the pre-created virtual machine.

As described herein, pre-created virtual machines can be shrunk to a tiny configuration. In this way, a pre-created virtual machine does not consume a large amount of resources.

Before shrinking the pre-created virtual machine, it can be allowed to initialize. The delay caused by initializing the machine can thus be avoided when a request for the virtual machine is granted, reducing the time between the request and when it is granted.

When advertising the pre-created virtual machines to the grid, a full size can be advertised instead of the tiny size.

Before the request is granted, the pre-created virtual machine can be ballooned to a desired size.

A pool of pre-created, live tiny virtual machines can be maintained in the grid, from which requests for virtual machines are granted.

In anticipation of future requests, additional machines can be kept in reserve, or creation of a new machine can begin upon destruction of an old one.

The techniques described herein can be applied in a grid environment to reduce the time between a request for a virtual machine and the eventual grant of the request. Thus, virtual machine technology can be widely used in a grid environment.

As described herein, a variety of other features and advantages can be incorporated into the technologies as desired.

The foregoing and other features and advantages will become more apparent from the following detailed description of disclosed embodiments, which proceeds with reference to the accompanying drawings.

DETAILED DESCRIPTION

Example 1

Exemplary System Employing a Combination of the Technologies

Figure 1:
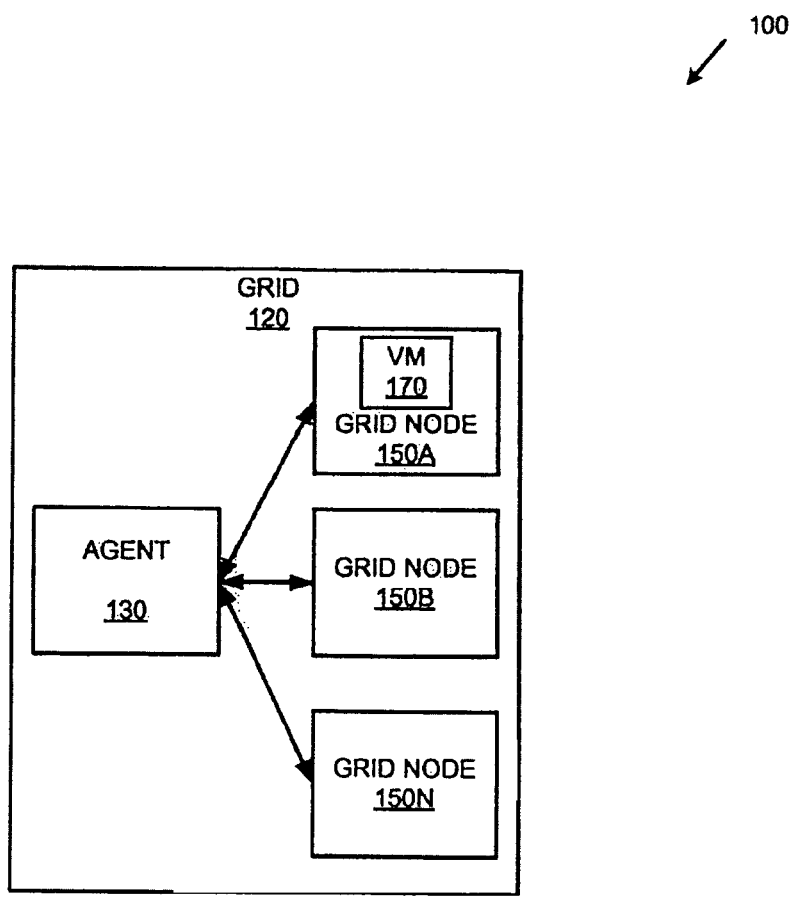
FIG. 1 is a block diagram of an exemplary system implementing pre-created virtual machines in a grid computing environment.

FIG. 1 is a block diagram of an exemplary system 100 implementing one or more pre-created virtual machines 170 in a grid computing environment 120. The system 100 and variants of it can be used to perform any of the methods described herein.

In the example, the grid 120 comprises a plurality of grid nodes 150A-N, access to which is governed by the agent 130. At least one of the grid nodes 150A-N provides one or more virtual machines 170 for processing of tasks in the grid 120.

In practice, the system 100 can be more complicated, with additional nodes, agents, virtual machines, and the like.

Example 2

Exemplary Applications of the Technologies

Absent the technologies described herein, the latency between when a virtual machine is requested and when it is available can be so high as to make virtual machine technology unattractive in a grid scenario.

The availability of improved performance for virtual machines in a grid environment can be quite beneficial. Virtual machines can improve resource provisioning, provide isolation between executing jobs, and enhance security. For example, virtual machines can be used as sandboxes in a grid.

Example 3

Exemplary Grid

In any of the examples herein, a grid can take a variety of forms. For example, a grid can comprise a plurality of grid nodes and one or more governance mechanisms (e.g., grid agents) that govern access to the grid nodes. In practice, the governance mechanism can serve as a central control over grid resource allocation and can be implemented in middleware for the grid. Any node supporting the standard framework implemented by the grid middleware can participate in the grid as a grid node.

In practice, a grid node can be a hardware resource, such as a physical computing device (e.g., a computer, server, workstation, or the like). A grid can support a node that is a collection of hardware resources (e.g., a plurality of computers, a cluster of computers, or the like). In practice, a node can also take the form of resources such as network resources, storage resources, and the like. A node can be an independent piece of hardware that makes itself available to the grid for processing of grid tasks via a standard framework as dictated by a central governance mechanism (e.g., a grid agent).

To clients of the grid, the grid appears as an abstraction of grid resources (e.g., CPU cycles, disk storage, memory, and the like) that are available for use. The client of the grid can submit a request for resources, such as processing a task or job. In response the grid allocates appropriate resources, processes the task, and provides results of processing.

Although grids can support heterogeneous hardware, a grid can be implemented in a homogenous manner. Similarly, a grid can support different administrative domains (e.g., to allow sharing of resources), but a grid can be administered as a single domain.

Example 4

Exemplary Virtual Machine

In any of the examples herein, a virtual machine can take a variety of forms, including any virtual execution environment. For example, a virtual machine can be a full virtual machine (e.g., as created by full system virtualization), a hosted virtual machine, a shared kernel virtual machine, or the like. Para-virtualization can be used to provide virtual machines. In practice, a virtual machine can create a virtualized environment in which software can execute. For example, the virtualized environment can appear to be a native machine (e.g., a particular type of computer), when in fact it is running on a different machine (e.g., a different type of computer).

Virtual machines can provide security advantages, such as the so-called "sandbox" model, by which the effects of executing software in the virtual machine are limited to a restricted area. In this way, accidental or malicious interference with other software running on the physical machine (e.g., other virtual machines) can be avoided.

Example 5

Exemplary Grid Agent

In any of the examples herein, a grid agent can govern access to grid resources. For example, clients of the grid can request resources from the grid agent, which then grants the request by allocating grid resources to the request.

The grid agent can communicate with grid nodes using a standard framework. For example, a resource request can be indicated in terms of processing needs (e.g., CPU cycles), storage (e.g., gigabytes), and memory (e.g., megabytes). Other resources can be included in the request.

Grid nodes can advertise the resources available at the node. Using the advertised information provided by the grid nodes, the grid agent can make resource allocation decisions (e.g., by matching resource requests to available resources).

Alternatively, a grid agent can simply maintain the list of resource requests made through the system, and the grid nodes will serve these requests based on their ability to do so. In such a case, grid nodes need not advertise resources available to the central agent.

Example 6

Exemplary Method of Providing Virtual Machine Functionality in a Grid

Figure 2:
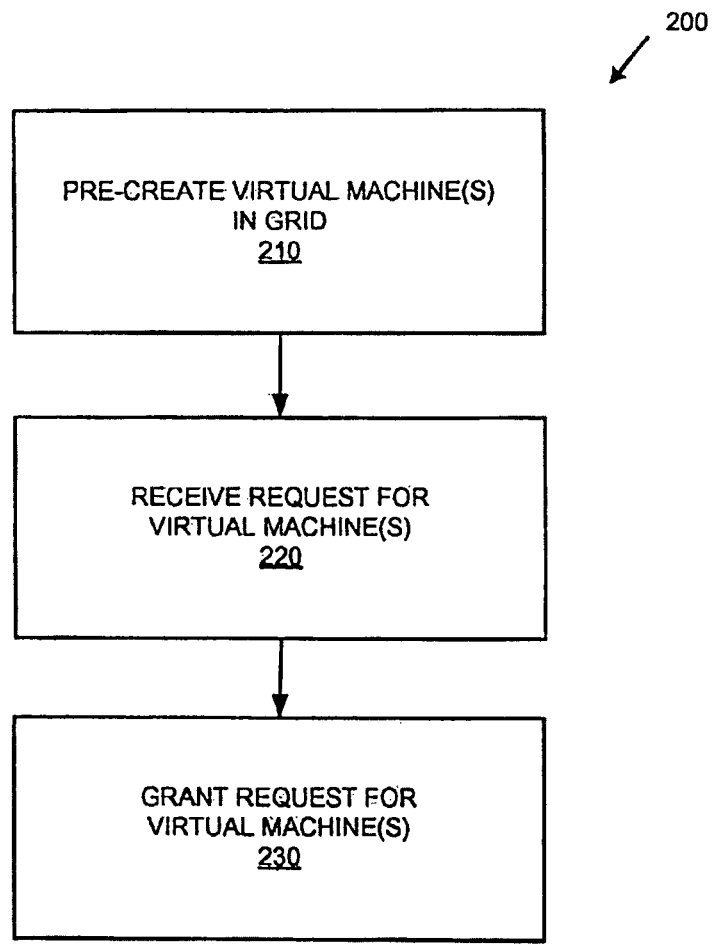
FIG. 2 is a flowchart of an exemplary method of providing virtual machines in a grid computing environment and can be implemented, for example, in a system such as that shown in FIG. 1.

FIG. 2 is a flowchart of an exemplary method 200 of providing virtual machines in a grid computing environment and can be used in any of the examples herein.

At 210, one or more virtual machines are pre-created in a grid. For example, a virtual machine can be instantiated at a grid node (e.g., before a request for it is received) as a pre-created virtual machine. As described herein, the pre-created virtual machine can be a live (e.g., executing) instance of a virtual machine. Further, as described herein, the virtual machine can be of a tiny configuration.

At 220, a request for one or more virtual machines is received.

At 230, the request for one or more virtual machines is granted via the pre-created virtual machines. For example, the request can be granted by providing access to (e.g., a job or task can be executed on) the pre-created virtual machine.

The described actions can be performed by a grid agent, by an agent at the grid node (e.g., at a physical computing device), or by both.

Example 7

Exemplary Method of Pre-creating Virtual Machine in a Grid

Figure 3:
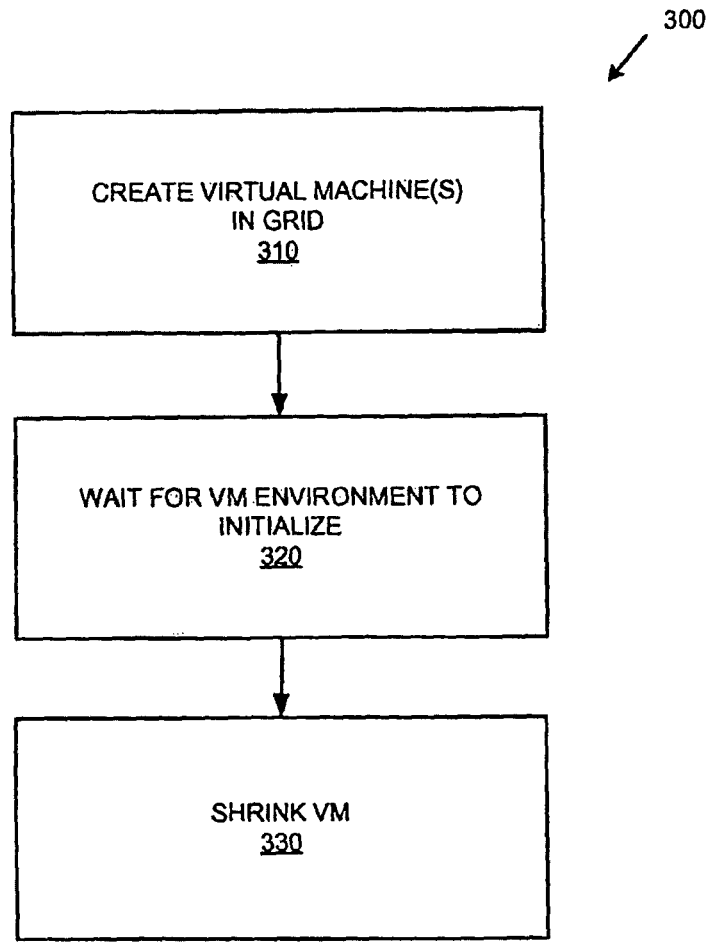
FIG. 3 is a flowchart of an exemplary method of pre-creating a virtual machine in a grid.

FIG. 3 is a flowchart of an exemplary method 300 of pre-creating a virtual machine in a grid computing environment and can be used in any of the examples herein.

At 310, one or more virtual machines are created in a grid.

At 320, the method waits for the virtual machine environment to initialize.

At 330, the virtual machine is shrunk. For example, the virtual machine can be reduced to a tiny configuration.

Example 8

Exemplary Instantiation

In any of the examples herein, pre-creation of a virtual machine can include instantiating a virtual machine at a grid node. For example, an instance of the virtual machine can be created, placed, or loaded into grid node memory (e.g., RAM, virtual memory, or the like) and resources can be allocated to it. The virtual machine can be instantiated at the same grid node at which it will eventually be deployed. Pre-creation can also include initiating execution of the virtual machine (e.g., the beginning of virtual machine run time).

Example 9

Exemplary Virtual Machine Configurations

In any of the examples described herein, a variety of virtual machine configurations can be supported. A configuration can indicate the resources (e.g., CPU time, memory, disk space, and the like) allocated to the virtual machine. For example, a creation configuration can be specified that indicates the resources to be allocated to a virtual machine when created. Such a configuration is sometimes called a "normal" configuration because it can be a default virtual machine configuration.

A tiny configuration can be specified that indicates the size at which pre-created virtual machines are to be maintained after initialization but before they are deployed to grant a request. Virtual machines in a tiny configuration can be maintained live (e.g., executing) before a request for them is received.

A deployed configuration can be specified that indicates the size at which the pre-created virtual machine is to be when it is allocated to grant a request. For example, the tiny configuration can be ballooned up to the deployed configuration. The deployed configuration and the creation configuration can be the same; in such a case, ballooning is sometimes called "restoring" the configuration. At the time of deployment, the actual configuration used for the virtual machine can be somewhat different from that initially specified. For example, the configuration can be determined dynamically at the time of deployment, based on available resources.

In practice, the configurations can be varied as appropriate. For example, a variety of deployed configurations can be supported so that the grid can provide variety in the resources allocated to virtual machines.

When advertising the size of the virtual machine (e.g., to the grid agent or to clients of the grid), the deployed configuration can be advertised, even though the virtual machine is actually executing as a tiny configuration.

Example 10

Exemplary Tiny Configuration

In any of the examples herein, a tiny configuration can be implemented for pre-created virtual machines. A tiny configuration can specify a minimal or miniscule amount of allocated CPU time, allocated memory, allocated storage (e.g., disk) space, and the like.

The tiny configuration can be a reduced configuration (e.g., less resources than that used to initialize the virtual machine) because configuration for the virtual machine can be reduced after the virtual machine initializes. For example, the allocated memory can be greatly reduced to a minimum block size. Allocated CPU time can be greatly reduced. And, allocated disk space can be reduced. If desired, the tiny configuration can include minimum values. For example, the smallest non-zero value or values (e.g., minimum RAM size, minimum CPU time, minimum disk size, or the like) supported by the virtual machine (e.g., that keep the virtual machine operational) can be used. A value that makes the machine inoperable can be avoided.

Other examples of tiny configurations include stand-by, dormant, dwarfed, or shrunk configurations.

Example 11

Exemplary Virtual Machine Initialization

During pre-creation of a virtual machine, before the virtual machine is shrunk to a tiny configuration, the virtual machine can be allowed to initialize. For example, the operating system of the virtual machine can boot up, and applications, utilities, monitors, daemons, and the like can be run as part of a start up process.

Thus, virtual machines can be pre-initialized. Subsequently, when a request for the virtual machine is granted, the delay involved in providing the virtual machine can be reduced because the virtual machine has already been initialized.

Initialization can be performed before the virtual machine is shrunk, allowing initialization to take advantage of a more conventional (e.g., non-tiny) allocation of resources (e.g., the creation allocation).

Example 12

Exemplary Method of Processing Request for Virtual Machine in a Grid

Figure 4:
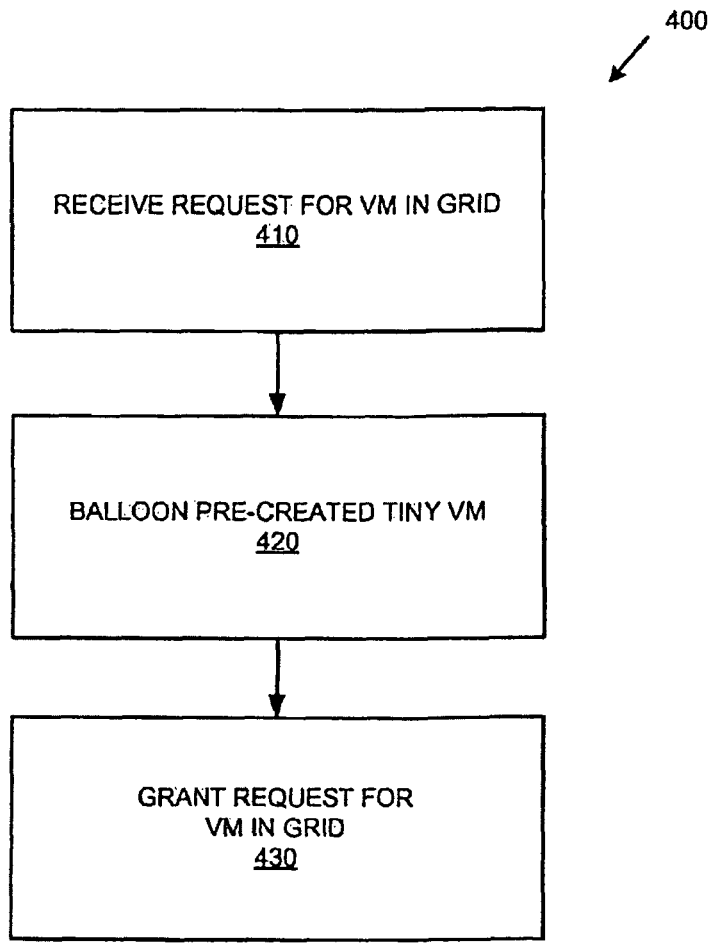
FIG. 4 is a flowchart of an exemplary method of processing a request for a virtual machine in a grid.

FIG. 4 is a flowchart of an exemplary method 400 of processing a request for a virtual machine in a grid computing environment and can be used in any of the examples herein.

At 410, a request for a virtual machine in a grid is received.

At 420, a pre-created tiny configuration virtual machine is ballooned (e.g., at run time of the virtual machine) to a deployed configuration. The deployed configuration can be a standard size, one out of a set of standard sizes, or determined at deployment time, based on available resources (e.g., at the physical computing device).

At 430, the request for the virtual machine in the grid is granted by providing access to the virtual machine of the deployed configuration. For example, a job or task can be executed on the virtual machine.

Example 13

Exemplary System Maintaining a Pool of Pre-created VMs

Figure 5:
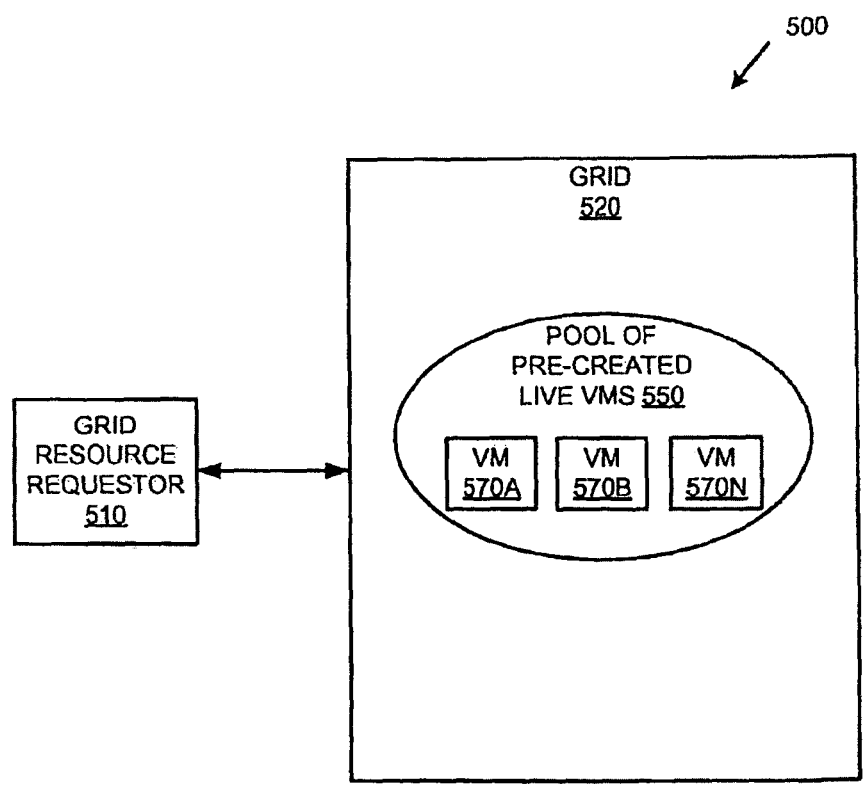
FIG. 5 is a block diagram of an exemplary system maintaining a pool of pre-created virtual machines in a grid computing environment.

FIG. 5 is a block diagram of an exemplary system 500 maintaining a pool 550 of pre-created virtual machines 570A-N in a grid 520. The virtual machines 570A-N can be unallocated (e.g., not allocated to a particular job).

In the example, a plurality of pre-created virtual machines 570A-N is maintained in a pool 550 within the grid 520.

A grid resource requestor 510 (e.g., client of the grid 520) can request a virtual machine, and the request can be granted by providing access to one of the virtual machines 570A-Z. As described herein, the pre-created virtual machines 570A-N can be maintained in a tiny configuration.

Although shown outside the grid 520, in practice the grid resource requestor 510 can be inside or outside the grid 520.

Example 14

Figure 6:
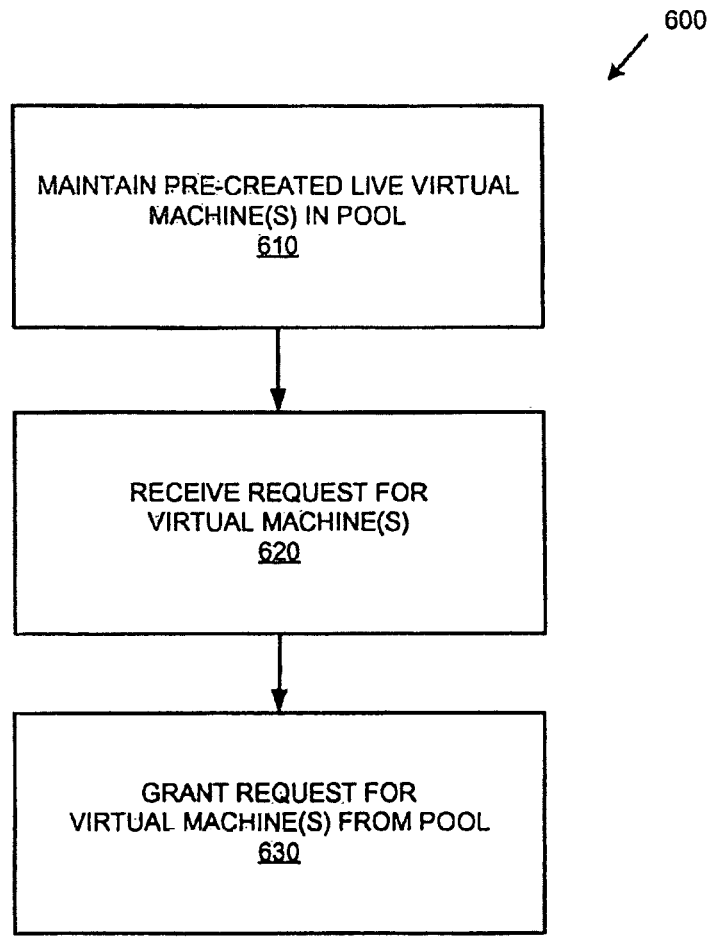
FIG. 6 is a flowchart of an exemplary method of maintaining a pool of pre-created virtual machines in a grid.

Exemplary Method of Maintaining a Pool of Pre-created Virtual Machines in a Grid FIG. 6 is a flowchart of an exemplary method 600 of maintaining a pool of pre-created virtual machines in a grid and can be used in any of the examples herein.

At 610, one or more pre-created virtual machines are maintained in a pool for a grid.

At 620, a request for one or more virtual machines is received.

At 630, a request for the one or more virtual machines is granted from the pool of pre-created live virtual machines.

Example 15

Exemplary Characteristics

The technologies described herein can be used to build systems and methods that have a variety of characteristics. Exemplary characteristics include the following: Reducing the time required to get a working virtual machine; ensuring that the virtual machine allocated to the grid job has the necessary hardware and software resources to perform the job; performing effective cleanup of the virtual machine once the job is complete; ensuring that the effect of a completed job does not spill over to another future job.

Example 16

Overview of Exemplary System Implementing Pre-created Tiny VMs in a Grid

The technologies described herein can be applied to create, in advance, virtual machines with configurations that consume very little resources. Such a virtual machine can be a called a "Tiny VM." The open source XEN virtualization tool can be used to create such virtual machines, and in the terminology of the XEN tool, tiny VMs can be domain Us that consume very little resources. For example, one such configuration could be 32 MB of RAM, 5% of CPU bandwidth, and a basic mount partition.

The grid middleware can be slightly modified to communicate with the host machine indicating the resources necessary to execute a given grid job. In response, the host machine can balloon one of the tiny VMs to the desired configuration. The grid middleware then hands over the job to this new virtual machine. Upon job completion, results are sent back to the middleware, and the VM is torn down. The entire process of ballooning the machine to its new configuration can take only a few milliseconds.

Example 17

Exemplary System Implementing Pre-created Tiny VMs in a Grid Via Agents

Figure 7:
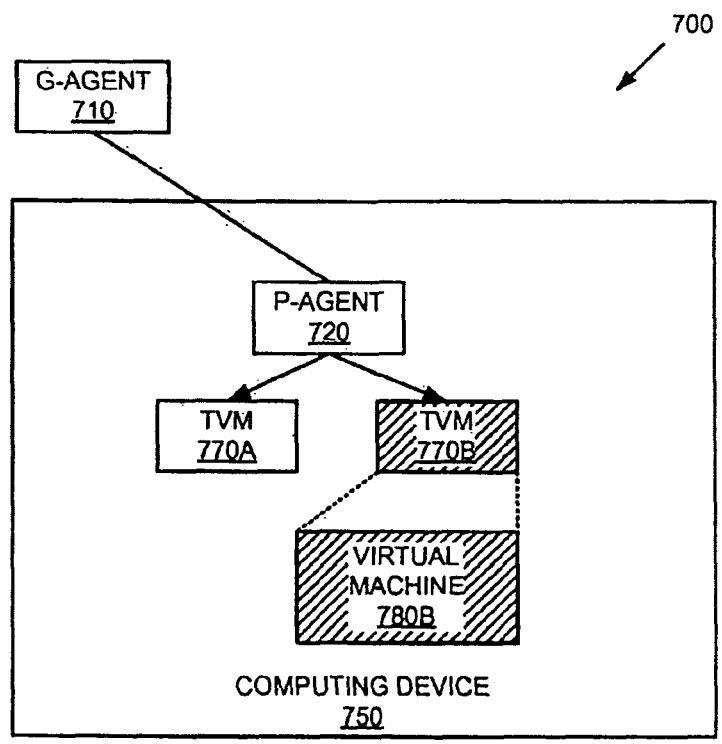
FIG. 7 is a block diagram of an exemplary system implementing pre-created tiny virtual machines in a grid via a grid agent and an agent at a grid node.

FIG. 7 is a block diagram of an exemplary system 700 implementing pre-created tiny virtual machines in a grid via a grid agent 710 and a grid node agent 720 at a grid node 750 (e.g., a computing device, such as a physical machine).

In the example, a p-agent 720 runs on a grid node hosting the virtual machines.

The g-agent 710 is a grid agent that runs on the grid middleware. In the example, the g-agent 710 and the p-agent 720 work in concert to provide access to a virtual machine 780B. The p-agent 720 pre-creates two tiny virtual machines 770A and 770B. As described herein, the tiny virtual machine 770B can be ballooned to be deployed as virtual machine 780B.

Example 18

Exemplary Method of Implementing Pre-created Tiny Virtual Machines in Grid

Figure 8:
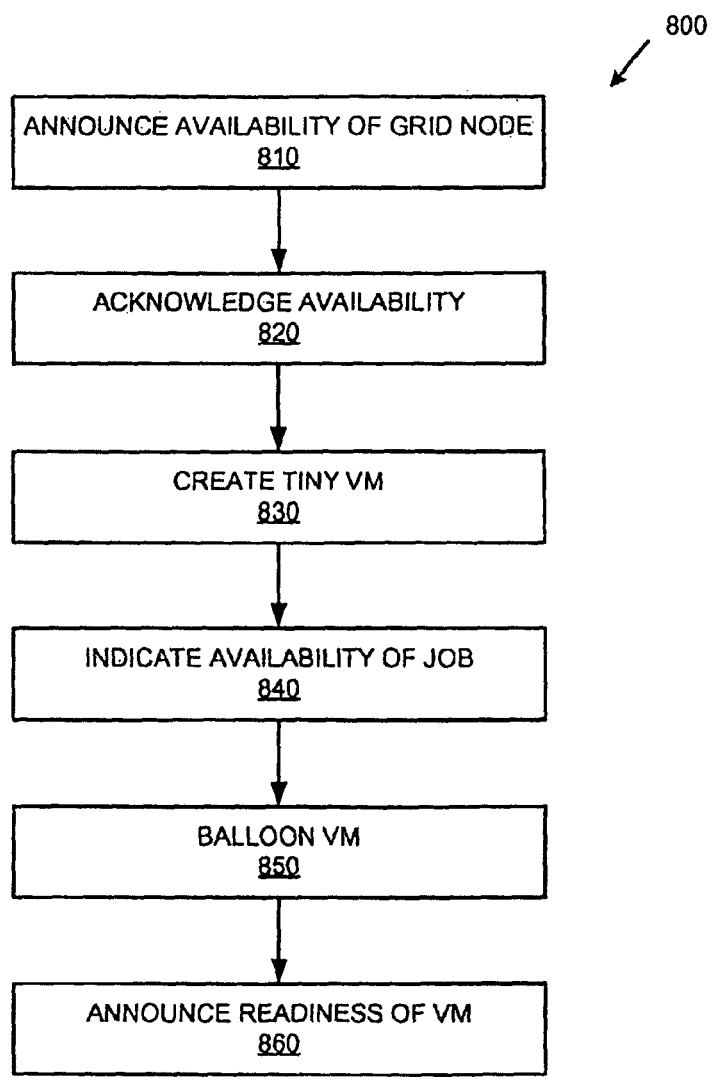
FIG. 8 is a flowchart of an exemplary method of implementing pre-created tiny virtual machines in a grid.

FIG. 8 is a flowchart of an exemplary method 800 of implementing pre-created tiny virtual machines in a grid and can be implemented in any of the examples herein, such as the system of FIG. 7.

The grid node (e.g., physical machine) can be set up for accepting grid jobs. For the machine to donate its resources to the grid, the p-agent announces itself to the g-agent at 810. For example, the p-agent can mention the number of virtual machines it is donating and also their capabilities. Acknowledgement by the g-agent can come at 820. The g-agent can use this information to schedule jobs on the virtual machines at a later point in time.

At 830, the p-agent can then go ahead and create tiny virtual machines equal in number to that advertised to the g-agent. For example, if virtual machines of 512 MB RAM, 20% CPU share, and 10 GB hard disk space are advertised, tiny virtual machines can be created with 32 MB RAM, 10% CPU share, and 1 GB hard disk.

Once the grid middleware finds a suitable job to run on the virtual machine, the g-agent can make an indication to the p-agent at 840.

At 850, the p-agent, in response, balloons one of the tiny virtual machines into a larger configuration. An appropriate operation can be performed on the virtual machine to increase memory allocated and increase CPU parameters.

At 860, the p-agent then indicates the readiness of the virtual machine to the g-agent, and the job is scheduled on the new virtual machine.

Once the job is completed and the results are returned to the grid middleware, the p-agent can tear down the virtual machine, free up its resources, and remove any left over state information (e.g., so that state information is inaccessible to later jobs).

Example 19

Exemplary Environment Supporting Virtual Machines

Any environment supporting virtual machines can be used to implement the virtual machine technologies described herein. For example, the XEN tool marketed by XenSource, Inc. of Palo Alto, Calif. can be used. The environment can support dynamic configuration of the virtual machines (e.g., changing configuration of the virtual machine at virtual machine run time).

Under the XEN tool, the balloon driver can be used to increase memory allocated to a virtual machine. The "xm" command can be used to increase CPU parameters. Other environments and newer versions of the XEN environment can have similar commands.

Example 20

Exemplary Unadvertised Pool of Virtual Machines

During cleanup (e.g., tear down, shut down, destruction, or the like) of a virtual machine, the total number of virtual machines available on the machine can be less than what is advertised to the grid middleware. At this point in time, the total number of virtual machines may not be equal to the promised number. Scheduling problems can result.

In any of the examples herein, an additional unadvertised virtual machine can be kept in the pool, which is added to the active virtual machines when cleanup, tear down, shut down, or destruction takes place.

Alternatively, or in addition, the initialization (e.g., boot up) of a new virtual machine can be started when an existing virtual machine is being cleaned up.

Example 21

Exemplary Live Virtual Machine

In any of the examples herein, a pre-created virtual machine can be a live (e.g., executing) instance of a virtual machine even though it has yet to be allocated to a particular task. In this way, the virtual machine can execute an initialization process if desired. If desired, execution of the live virtual machine can be suspended at some point after initialization.

A minimal amount of CPU cycles (e.g., as part of a tiny configuration) can be allocated for consumption by the virtual machine to minimize resources consumed by the pre-created virtual machine.

Example 22

Exemplary Configuration File

In any of the examples herein, a configuration file can be used (e.g., stored at the grid node). The configuration file can contain configuration entries, such as the name and network address of the grid agent, number of virtual machines to be configured at the grid node, the resource allocation values to be used in a tiny configuration, and the like.

Example 23

Exemplary Determination of Initialization Completion

In any of the examples herein, a variety of techniques can be used to determine when initialization is complete. For example, when waiting for a virtual machine to initialize, a ping operation can be used to determine when to stop waiting. A successful ping indicates that the virtual machine is fully up and running.

Example 24

Exemplary Combination of Technologies

An exemplary combination of the technologies can be implemented as shown in the exemplary pseudo code in Tables 1 and 2. In the example, a p-agent and g-agent are used, such as shown in FIG. 7.

TABLE 1

Pseudo Code for a p-agent

```
====================================================
p-agent
====================================================
function main(...) {
  read configuration file and load configuration entries
    entries include g-agent server name/IP, number of virutal
      machines in the machine, Tiny VM configuration
  inform g-agent about the availability of this machine
  listenForMessage(&message);
}
function listenForMessage(message) {
  switch message {
    g-agent-ack:
      for (int i = 0; i < maxTinyVM; i++) {
        createVMs(i)
        shrinkVM(i)
      }
      break;
    job-arrival:
      hostJob( );
      break;
  }
}
function createVM(int vmID) {
  read default (e.g., creation) configuration of VM from configuration file
    and create a VM, VM to be identified by VMID
  VM to be created with normal size for the startup scripts and boot
    to complete normally
}
function shrinkVM(int vmID) {
  create a process thread for each VMID and execute the following
    steps in the worker thread
```

TABLE 1-continued

Pseudo Code for a p-agent

```
  if VM identified by VMID is fully up & running, (identified
    through a ping operation) peform shrink operation. Details
    about Tiny VM are already loaded into program data
    structures from the configuration files
  share the original machine's configuration with the g-agent through a
    message, this is done so that the grid middleware thinks that
    the machine actually has larger virtual machines and not tiny
    machines. Tiny machine configuration may be inadequate for most
    jobs
  Terminate thread
}
function hostJob( ) {
  package the job and all its inputs and arguments into an archive file
    and the same is compressed
  A shadow process is forked to manage the job inside a virtual machine
  The steps below happen in the child process, while the parent process
    continues listening for new messages
    Identify an idle tiny VM and expand the resources using ballooning
      operation to match what was advertised on its behalf.
    A proxy server is run inside the VM to negotiate with the p-agent.
    Proxy server connects to the shadow process created and requests the
      job files. The shadow process in the p-agent then shares the
      contents from p-agent into the virtual machine and monitors the
      job inside the virtual machine.
    Shadow process will be notified about job completion by the proxy
      and all the output files are sent back to the shadow process, which
      then transfers control to the grid middleware through the g-agent
      shadow process then terminates the virtual machine to avoid state
      information from being passed from one job instance to another
      shadow process calls the createVM(vmID) and shrinkVM(vmID)
      to create another tinyVM for future jobs before exiting
```

TABLE 2

Pseudo Code for a g-agent

```
====================================================
g-agent
====================================================
function main(...) {
  registerWithGridMiddleware( );
  pollforpAgent(&message);
}
function pollforpAgent(message) {
  switch message
    case registration:
      process p-agent registration and acknowledge the message
      break;
    case vm-registration:
      original VM's configuration is shared with g-agent from p-agent
        once the shrink operation is complete. send this information
        to the grid middleware, so that it thinks that a VM is readily
        available for job execution
    case job-completion:
      Upon job completion p-agent's shadow process sends a message to
        indicate both job completion as well as virtual machine
        termination process both and update grid middleware
        appropriately
}
```

Example 25

Exemplary Experiments

An implementation of the technologies described herein was tested to compare a pre-creation approach with on-demand instantiation of virtual machines. Three sets of experiments were carried out to determine the time it takes for a tiny virtual machine to expand and assume full size for a grid job to be run.

First, the time consumed in expanding memory of the tiny virtual machine was evaluated. Second, the effects of increasing both the memory allocated to a virtual machine and CPU slices allocated simultaneously were examined. Finally, the performance of virtual machine expansion considering all three aspects vis-à-vis memory, CPU, and disk were assessed. The results from the tests can be used to compare with the time it takes for a virtual machine to start afresh on demand when the grid job arrives.

Figure 9:
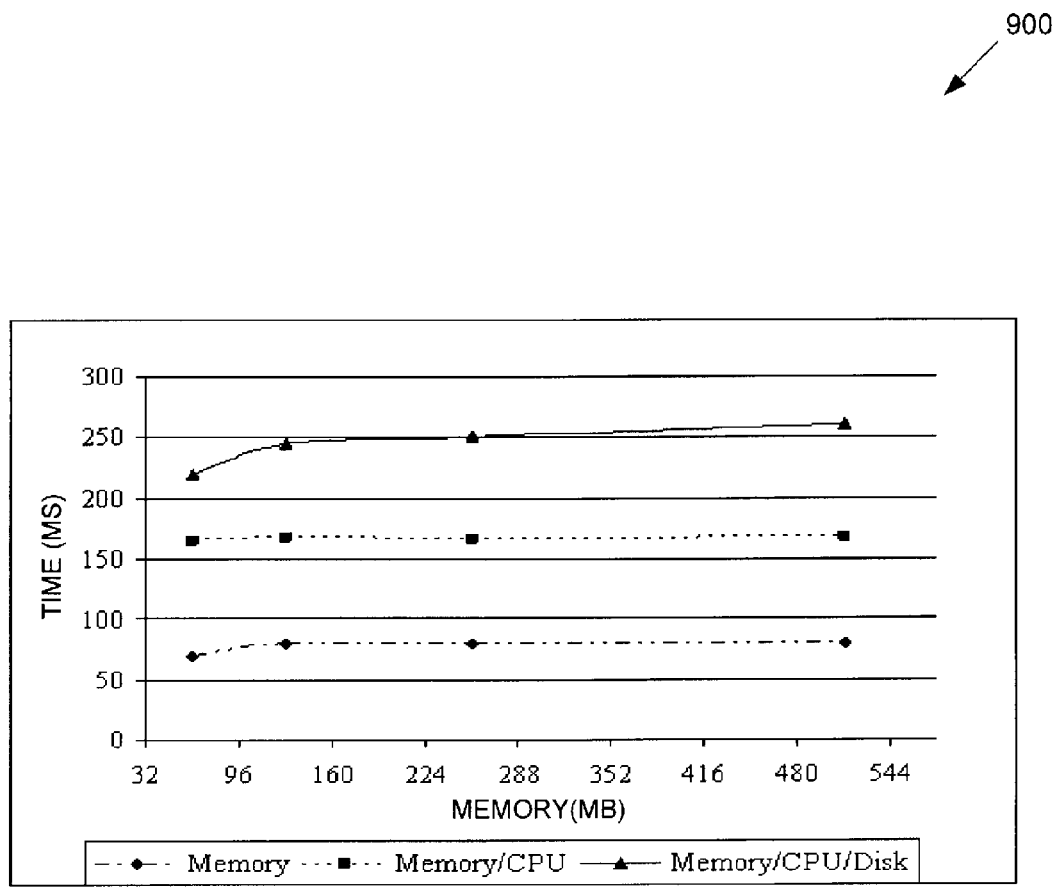
FIG. 9 is a graph showing a comparison of expansion times for different configurations of a virtual machine.

Experiments were performed with a latest stable release of XEN 2.0.6 on Linux 2.6.11.12 running on an INTEL PENTIUM IV 3.2 GHz with 1 GB RAM and 40 GB storage. XEN Domain 0 was set up with 128 MB and 10 GB of disk space. Shell scripts were used to conduct the tests, and XEN management commands were used to expand memory and CPU slices. In the tests, each iteration used a new VM/Domain instance for the experiment, and the experiments were repeated to ascertain that the times recorded were reliable and consistent. The results of the experiments are tabulated and presented below. FIG. 9 is a graph 900 showing a comparison of expansion times for different configurations of a virtual machine as determined by the experiments.

Example 26

Exemplary Results

The first test measures the time it takes to expand the memory allocated to a XEN domain from a minimal state (as in a tiny virtual machine) of 32 MB to 64 MB or higher. The ballooning option available in XEN is used to expand the memory allocated to a domain.

As is evident from Table 3 and the graph 900 of FIG. 9, the time the system takes to expand a domain's memory from 32 MB to 64 MB or 32 MB to 512 MB is uniform. It can thus be concluded from the recorded results that the system is likely to take the same amount of time to expand regardless of the size of expansion.

TABLE 3

Memory Ballooning

| # | Memory(MB) | Time (ms) |
|---|---|---|
| 1 | 64 | 70 |
| 1 | 128 | 80 |
| 3 | 256 | 80 |
| 4 | 512 | 80 |

In the second set of experiments, both the memory and the CPU slices were expanded and the time to complete both operations was recorded. A tiny virtual machine having 32 MB of RAM and with a 10% CPU slice was used as the reference configuration for each test, and the memory was exponentially incremented by a factor of 2 and CPU slice increased in steps of 10%. The memory was expanded all the way to 512 MB, while the CPU slice allocated up to 50%. The Borrowed Virtual Time (bvt) scheduler option in XEN was used to increase the CPU slice and the ballooning option was used for increasing the memory as in the earlier test.

TABLE 4

Memory/CPU Expansion

| # | Memory(MB) | CPU % | Time (ms) |
|---|---|---|---|
| 1 | 64 | 20 | 165 |
| 1 | 128 | 30 | 167 |
| 3 | 256 | 40 | 166 |

TABLE 4-continued

Memory/CPU Expansion

| # | Memory(MB) | CPU % | Time (ms) |
|---|---|---|---|
| 4 | 512 | 50 | 168 |

As in the earlier case, in Table 4, the expansion time remains uniform, and the expansion size does not affect the time taken for expanding the resources for a virtual machine.

TABLE 5

Memory/CPU Expansion

| # | Memory(MB) | CPU % | Mount (MB) | Time (ms) |
|---|---|---|---|---|
| 1 | 64 | 20 | 100 | 220 |
| 1 | 128 | 30 | 200 | 245 |
| 3 | 256 | 40 | 300 | 250 |
| 4 | 512 | 50 | 400 | 260 |

Finally, the memory and CPU were increased as in the above test cases in addition to mounting disk partitions of up to 500 MB in steps of 100 MB. Virtual block devices were created and mounted for providing additional storage to the virtual machine for the test. It can be seen from the results in Table 5 that with the increase in the size of the disk mount, the time taken linearly increases. This is attributed to the time taken to create the virtual block devices.

Example 27

Exemplary Further Techniques

Pre-created virtual machines can consume resources even when idle. To address this situation, policies can be set at the nodes. For example, resource consumption by the pre-created virtual machines can be limited to a ceiling (e.g., 10% of memory of the physical machine).

A virtual machine scheduler (e.g., BVT or the like) can be used to reduce CPU usage for the pre-created virtual machines to near zero.

At time of ballooning, virtual block devices can be created. In this way, disk space waste can be reduced.

Example 28

Exemplary Advantages

With the technologies described herein, it is possible to have the virtual machine up in the order of hundreds of milliseconds as can be seen in the results above. This is one hundredth the time it takes to bring up the virtual machine from scratch. An immediate improvement in performance can be seen for grid jobs that typically run for a few seconds. For such jobs, the overhead of starting a new virtual machine before the job is run in an on-demand technique would be overkill. The technologies described herein can bring the overhead down to the order of a few hundred milliseconds. Thus, instant access to the virtual machine can be provided.

Example 29

Exemplary Benefits

The technologies described herein can have any of the following benefits: Latency in getting a grid node (e.g., physical machine) ready for accepting grid jobs can come down dramatically. Resources can be provisioned dynamically between virtual machines, improving overall utilization. The cleanup of the virtual machines upon job completion can ensure that no state information is left behind. The promised number of virtual machines can be available.

Example 30

Exemplary Further Information

As grids move to enterprises, the need for an execution environment becomes extensive. Increasingly, virtual machines will be looked upon to facilitate creation of an execution environment for the grids. But, inherent complexities and issues with implementing the virtual machines for an execution environment may impede adoption of virtual machines.

The techniques described herein (e.g., creating tiny virtual machines before a job request and expanding the virtual machine to suit the arriving job on demand and the like) can go a long way in addressing the concerns impeding adoption of virtual machines.

It is possible to build a grid architecture with virtual machines (e.g., for sandboxing) at executing nodes without affecting the overall execution time with the guarantees of isolation, fault tolerance, resource control, and the like.

Example 31

Exemplary Computing Environment

Figure 10:
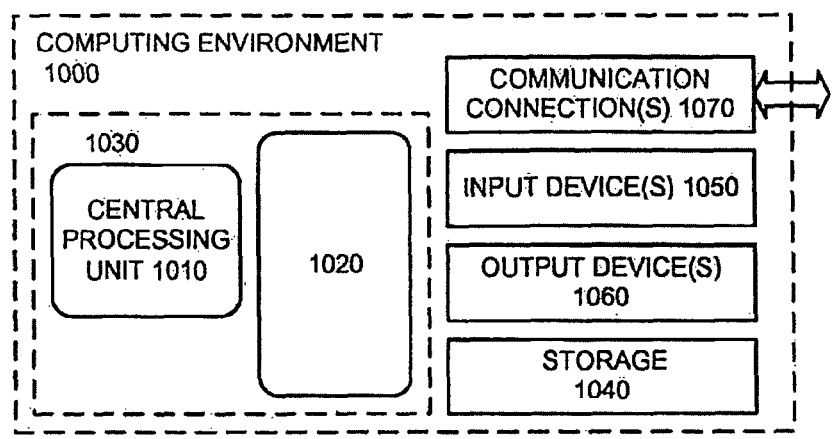
FIG. 10 is a block diagram of an exemplary suitable computing environment for implementing any of the technologies described herein.

FIG. 10 illustrates a generalized example of a suitable computing environment 1000 in which the described techniques can be implemented. For example, computing devices (e.g., physical machines) described herein can be configured as shown in the environment 1000. The computing environment 1000 is not intended to suggest any limitation as to scope of use or functionality, as the technologies can be implemented in diverse general-purpose or special-purpose computing environments. Mobile computing devices can similarly be considered a computing environment and can include computer-readable media. A mainframe environment can be different from that shown, but can also implement the technologies and can also have computer-readable media, one or more processors, and the like.

With reference to FIG. 10, the computing environment 1000 includes at least one processing unit 1010 and memory 1020. In FIG. 10, this basic configuration 1030 is included within a dashed line. The processing unit 1010 executes computer-executable instructions and can be a real or a virtual processor. In a multi-processing system, multiple processing units execute computer-executable instructions to increase processing power. The memory 1020 can be volatile memory (e.g., registers, cache, RAM), non-volatile memory (e.g., ROM, EEPROM, flash memory, etc.), or some combination of the two. The memory 1020 can store software implementing any of the technologies described herein.

A computing environment can have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The storage 1040 can be removable or non-removable, and includes magnetic disks, magnetic tapes or cassettes, CD-ROMs, DVDs, or any other computer-readable media which can be used to store information and which can be accessed within the computing environment 1000. The storage 1040 can store software containing instructions for any of the technologies described herein.

The input device(s) 1050 can be a touch input device such as a keyboard, keypad, touch screen, mouse, pen, or trackball, a voice input device, a scanning device, or another device that provides input to the computing environment 1000. For audio, the input device(s) 1050 can be a sound card or similar device that accepts audio input in analog or digital form, or a CD-ROM reader that provides audio samples to the computing environment. The output device(s) 1060 can be a display, printer, speaker, CD-writer, or another device that provides output from the computing environment 1000.

The communication connection(s) 1070 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the above can also be included within the scope of computer readable media.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules can be combined or split between program modules as desired in various embodiments. Computer-executable instructions for program modules can be executed within a local or distributed computing environment.

Methods in Computer-Readable Media

Any of the methods described herein can be implemented by computer-executable instructions in one or more computer-readable media (e.g., computer-readable storage media, other tangible media, or the like). Such computer-executable instructions can cause a computer to perform the described method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of these claims.

We claim:

1. A computer-implemented method comprising:
pre-creating one or more virtual machines in a grid computing environment, wherein the pre-creating comprises:
instantiating at least one virtual machine as a pre-created virtual machine;
initializing the pre-created virtual machine;
determining that the initializing has completed; and
responsive to the determining that the initializing has completed, reducing resources allocated to the pre-created virtual machine to a reduced configuration;
advertising a deployed configuration for the pre-created virtual machine when the pre-created virtual machine is of the reduced configuration;
after pre-creating the one or more virtual machines, receiving a request for access to a virtual machine; and
responsive to the request, granting the request by providing access to the pre-created virtual machine.

2. The method of claim 1, wherein the pre-creating comprises creating a live instance of the pre-created virtual machine.

3. The method of claim 1 wherein the reducing the resources allocated to the pre-created virtual machine is performed before receiving the request for access to the virtual machine.

4. The method of claim 1 wherein the pre-created virtual machine executes after instantiation.

5. The method of claim 4 wherein:
the initializing the pre-created virtual machine comprises booting up an operating system on the pre-created, executing virtual machine.

6. The method of claim 4 wherein:
the pre-creating comprises allocating sufficient resources for the pre-created virtual machine to initialize.

7. The method of claim 1, wherein pre-creating comprises:
creating the pre-created virtual machine as having a tiny configuration.

8. The method of claim 7 further comprising:
advertising the pre-created virtual machine having a tiny configuration as having a non-tiny configuration.

9. The method of claim 7 wherein the tiny configuration comprises:
a minimal memory configuration.

10. The method of claim 7 wherein the tiny configuration comprises:
a minimal CPU slice configuration.

11. The method of claim 7 wherein the tiny configuration comprises:
a minimal hard disk configuration.

12. The method of claim 7 further comprising:
after receiving the request for access to the pre-created virtual machine, increasing the pre-created virtual machine from the tiny configuration to the deployed configuration.

13. The method of claim 12 wherein resources for the deployed configuration are determined when the request for access to the virtual machine is received.

14. One or more non-transitory computer-readable storage media comprising computer-executable instructions causing a computer to perform the method comprising:
pre-creating one or more virtual machines in a grid computing environment, wherein the pre-creating comprises:
instantiating at least one virtual machine as a pre-created virtual machine;
initializing the pre-created virtual machine;
determining that the initializing has completed; and
responsive to the determining that the initializing has completed, reducing resources allocated to the pre-created virtual machine to implement the pre-created virtual machine in a tiny configuration;
advertising a deployed configuration for the pre-created virtual machine when the pre-created virtual machine is of the tiny configuration;
after pre-creating the one or more virtual machines, receiving a request for access to a virtual machine; and
responsive to the request, granting the request by providing access to the pre-created virtual machine.

15. The method of claim 1 further comprising:
upon completion of a job running on the pre-created virtual machine, tearing down the pre-created virtual machine, whereby state for the pre-created virtual machine is inaccessible to later jobs.

16. The method of claim 1 further comprising:
advertising a number indicating how many virtual machines are available; and
pre-creating at least one additional virtual machine beyond the number advertised; and
at tear down, shut down, or destruction of at least one of the virtual machines, making the at least one additional virtual machine available.

17. An apparatus comprising:
one or more processing units;
memory;
a grid agent configured to receive a request for a virtual machine in the grid and forward the request to a grid node agent for granting; and
a grid node agent configured to pre-create a virtual machine and receive a request for a virtual machine from the grid agent; wherein the grid node agent is configured to grant the request for the virtual machine by providing access to the pre-created virtual machine;
wherein the grid node agent is configured to pre-create the virtual machine at least by:
instantiating the virtual machine as the pre-created virtual machine;
initializing the pre-created virtual machine;
determining that the initializing has completed; and
responsive to the determining that the initializing has completed, reducing resources allocated to the pre-created virtual machine to a reduced configuration; and
wherein the grid node agent is configured to advertise the pre-created virtual machine to the grid agent as being of a configuration larger than the reduce configuration of the pre-created virtual machine.

18. The apparatus of claim 17 wherein the grid node agent is configured to reduce the pre-created virtual machine to a tiny configuration before receiving the request for the virtual machine from the grid agent.

19. The apparatus of claim 17 wherein the grid node agent is configured to wait for the virtual machine to initialize before reducing the pre-created virtual machine to a tiny configuration.

20. A computer-implemented method comprising:
- in advance of a request for a virtual machine, pre-creating the virtual machine in a grid, wherein the virtual machine is live and has a creation configuration after creation;
- initializing the live virtual machine;
- using a ping operation, determining that the live virtual machine has initialized, wherein initialization comprises booting an operating system in the live virtual machine;
- responsive to the determining that the live virtual machine has initialized, reducing configuration of the live virtual machine to a tiny configuration, the reducing comprising:
  - reducing CPU time allocated to the live virtual machine;
- advertising availability of a live virtual machine as of a deployed configuration, even though the live virtual machine is of the tiny configuration and not of the deployed configuration;
- responsive to a request for a virtual machine in the grid, ballooning configuration of the live virtual machine from the tiny configuration to the advertised deployed configuration, the ballooning comprising increasing memory allocated to the live virtual machine; and
- after ballooning configuration of the live virtual machine to the advertised deployed configuration, providing instant access to the live virtual machine.

* * * * *